United States Patent
Park et al.

(10) Patent No.: US 8,331,948 B2
(45) Date of Patent: Dec. 11, 2012

(54) METHOD AND APPARATUS OF OPERATING FEMTO BASE STATION IN WIRELESS COMMUNICATION SYSTEM

(75) Inventors: Gi Won Park, Anyang-si (KR); Ki Seon Ryu, Anyang-si (KR); In Uk Jung, Anyang-si (KR); Yong Ho Kim, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/142,839

(22) PCT Filed: Dec. 22, 2009

(86) PCT No.: PCT/KR2009/007679
§ 371 (c)(1),
(2), (4) Date: Jun. 29, 2011

(87) PCT Pub. No.: WO2010/077002
PCT Pub. Date: Jul. 8, 2010

(65) Prior Publication Data
US 2011/0287772 A1   Nov. 24, 2011

Related U.S. Application Data

(60) Provisional application No. 61/142,223, filed on Jan. 2, 2009.

(30) Foreign Application Priority Data

Apr. 22, 2009 (KR) .................. 10-2009-0034865

(51) Int. Cl.
*H04W 68/00* (2009.01)
*H04W 72/00* (2009.01)

(52) U.S. Cl. ........................................ 455/450; 455/458
(58) Field of Classification Search .................. 455/450, 455/466, 458, 447–448, 423–425, 418–420, 455/426.1; 370/328, 338, 312
See application file for complete search history.

(56) References Cited

U.S. PATENT DOCUMENTS

| | | | | |
|---|---|---|---|---|
| 7,855,977 | B2 * | 12/2010 | Morrison et al. | 370/252 |
| 8,059,579 | B1 * | 11/2011 | Talley et al. | 370/321 |
| 2007/0105568 | A1 * | 5/2007 | Nylander et al. | 455/458 |
| 2008/0267114 | A1 * | 10/2008 | Mukherjee et al. | 370/315 |
| 2009/0111470 | A1 * | 4/2009 | Thakare | 455/436 |
| 2009/0221261 | A1 * | 9/2009 | Soliman | 455/343.2 |
| 2010/0159917 | A1 * | 6/2010 | Majmundar et al. | 455/423 |

FOREIGN PATENT DOCUMENTS

| | | |
|---|---|---|
| JP | 2000-036818 | 2/2000 |
| JP | 2007-318629 | 12/2007 |
| KR | 1020000032681 | 6/2000 |
| WO | 2008/046351 | 4/2008 |

* cited by examiner

*Primary Examiner* — Brandon Miller
(74) *Attorney, Agent, or Firm* — Lee, Hong, Degerman, Kang & Waimey

(57) ABSTRACT

A method and apparatus of operating a femto base station in a wireless communication system is provided. A first announcement message indicating service interruption is transmitted. A second announcement message indicating service recovery is transmitted. The second announcement message is transmitted to a user equipment or a macro base station having a wider cell area than the femto base station. Reliability of a communication service can be maintained for a user equipment even if a service of a femto base station is temporarily interrupted.

12 Claims, 6 Drawing Sheets

[Fig. 1]
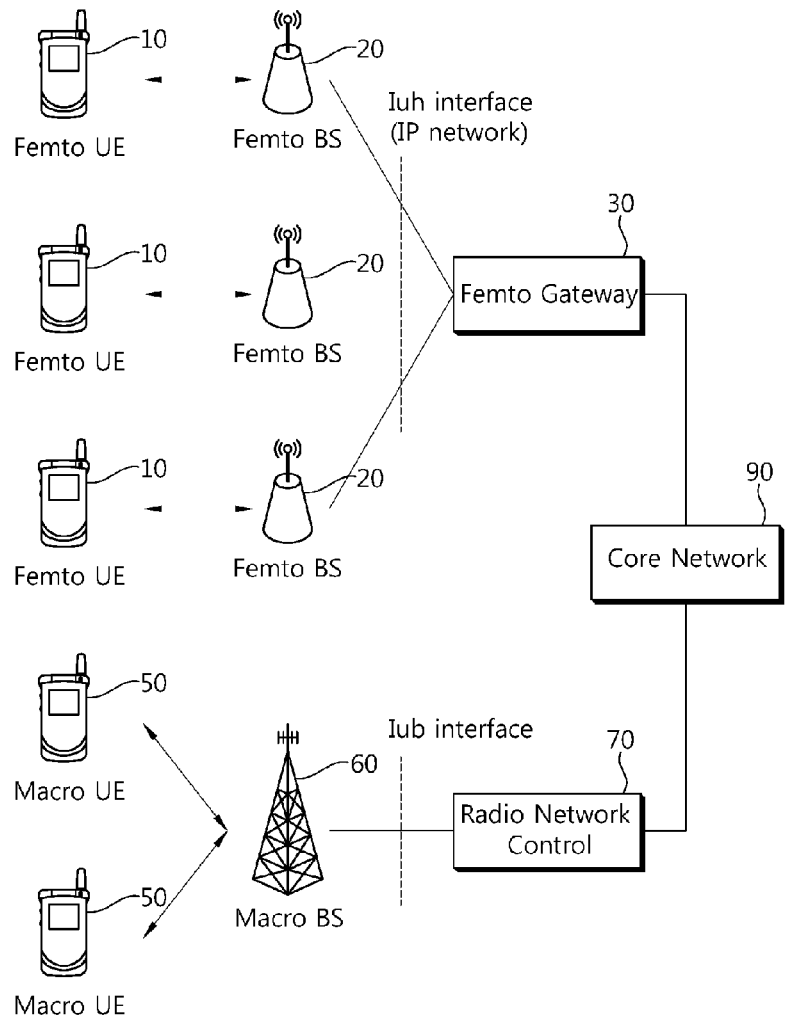
[Fig. 2]
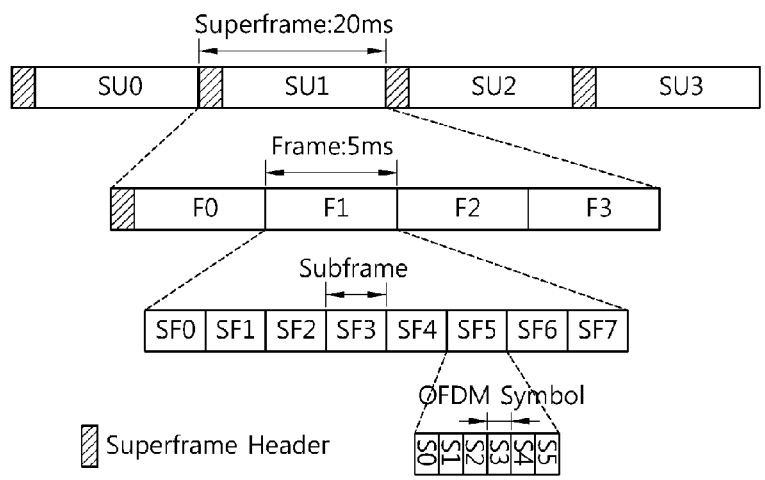

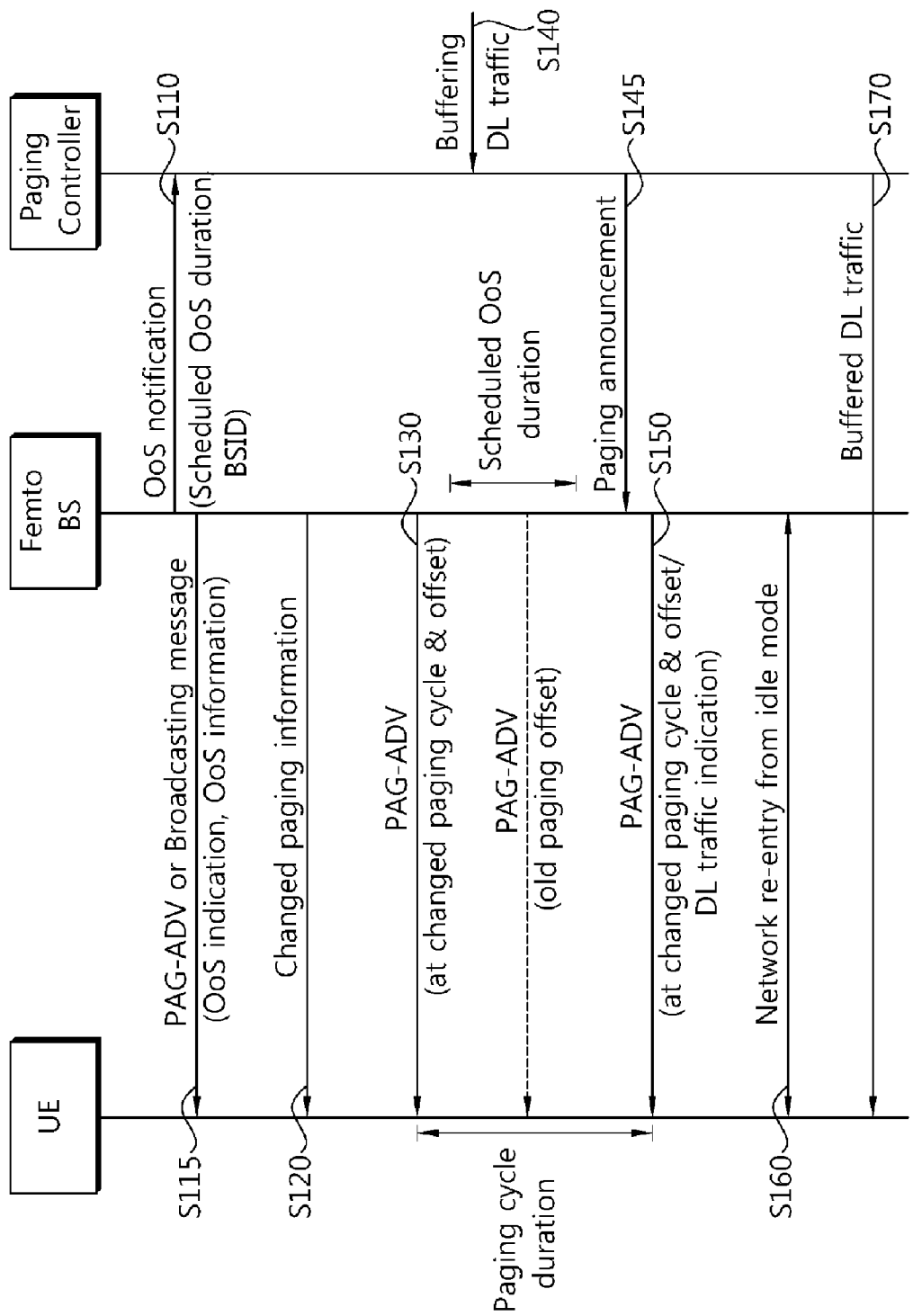

[Fig. 4]
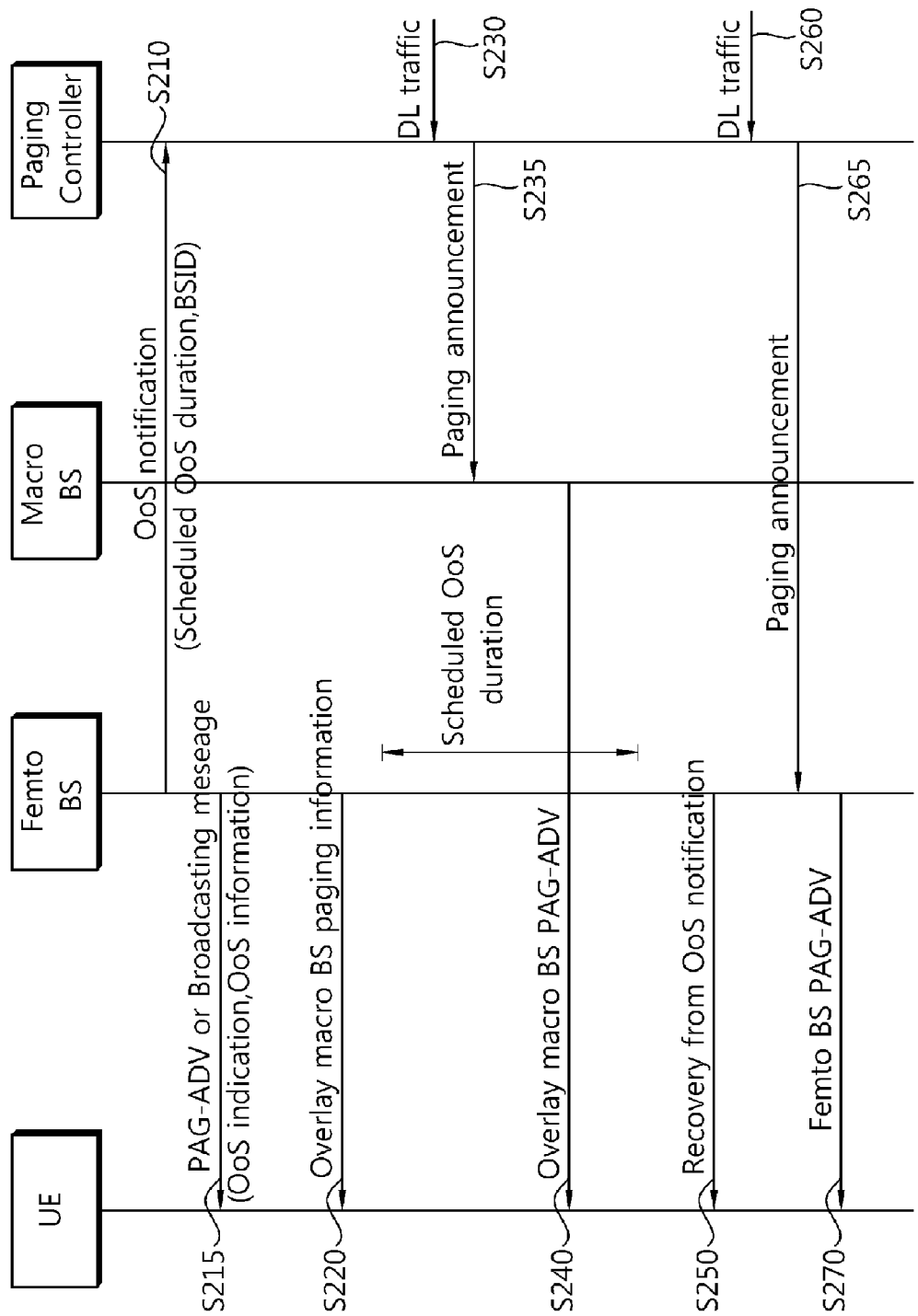

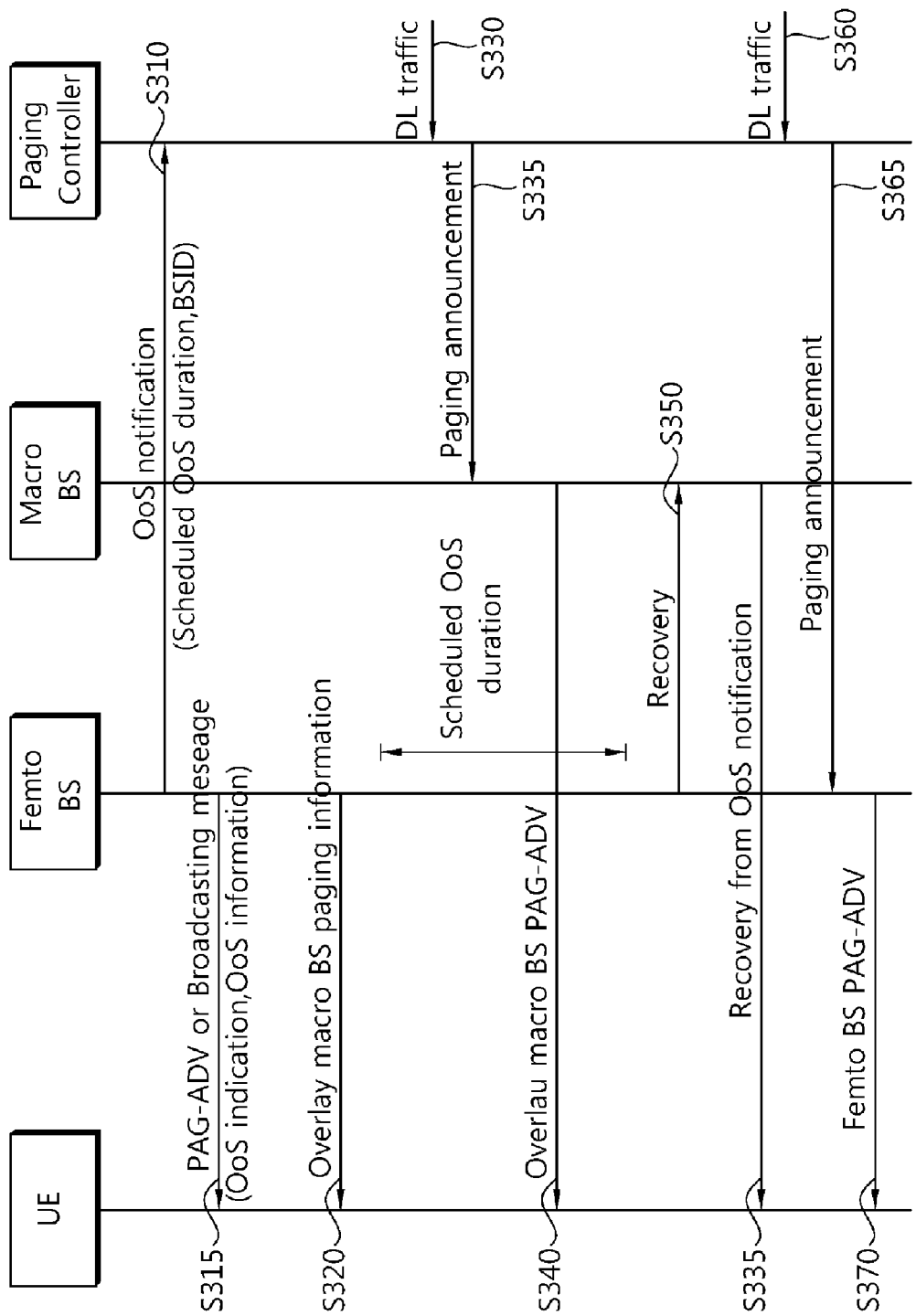
[Fig. 5]

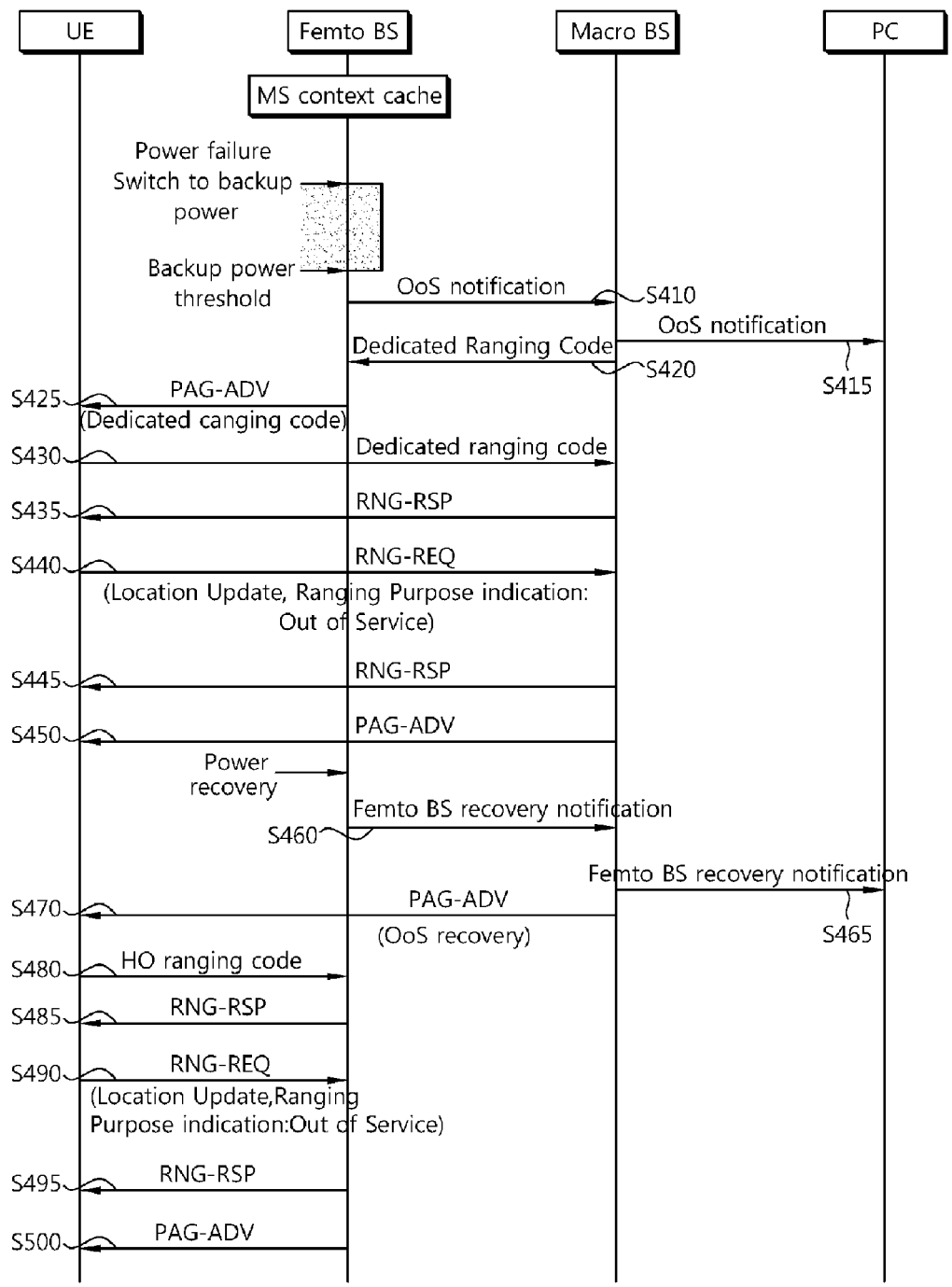
[Fig. 6]

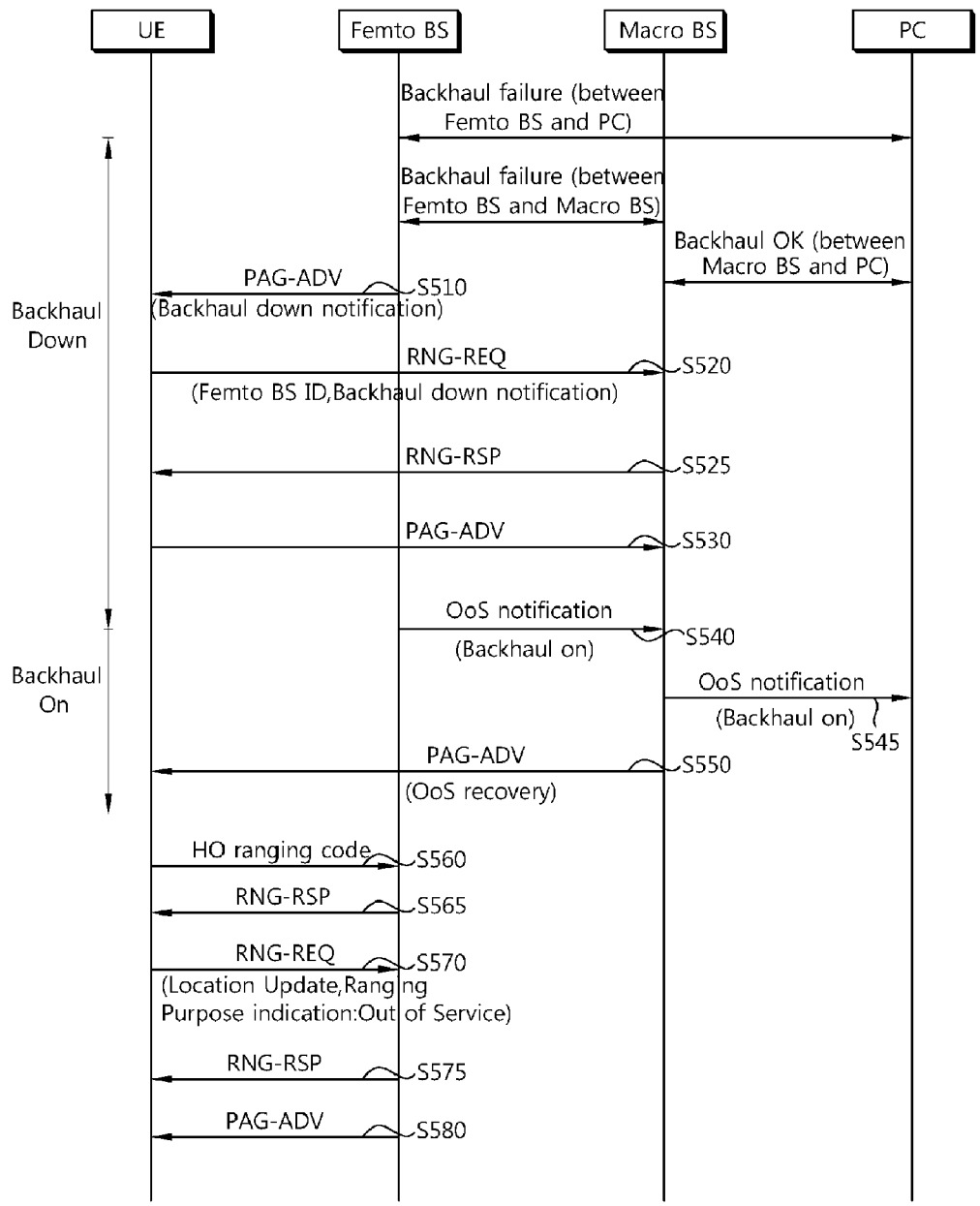

METHOD AND APPARATUS OF OPERATING FEMTO BASE STATION IN WIRELESS COMMUNICATION SYSTEM

CROSS-REFERENCE TO RELATED APPLICATIONS

This application is the National Stage filing under 35 U.S.C. 371 of International Application No. PCT/KR2009/007679, filed on Dec. 22, 2009, which claims the benefit of earlier filing date and right of priority to Korean Application No. 10-2009-0034865, filed on Apr. 22, 2009, and claims the benefit of U.S. Provisional Application Ser. No. 61/142,223, filed on Jan. 2, 2009, the contents of all of which are incorporated by reference herein in their entirety.

TECHNICAL FIELD

The present invention relates to wireless communications, and more particularly, to a method of operating service interruption and recovery of a femto base station.

BACKGROUND ART

With the development of communication and the spread of multimedia technology, a wireless communication system uses various techniques for massive data transmission. A method of assigning a more number of frequency resources may be used as a method of increasing radio capacity. However, since the number of frequency resources is limited, there is a limitation when the more number of frequency resources are assigned to a plurality of users. As one of methods for effectively utilizing the limited frequency resources, there is a method of creating a small-sized cell. When the small-sized cell is created, one base station (BS) provides a service to a less number of users, and thus the BS can assign a more number of frequency resources to the users. By creating the small-sized cell, a service for massive data transmission with better quality can be provided to the plurality of users.

A technique related to a femto BS installed in homes or businesses is actively ongoing in recent years. The femto BS represents a very small-sized mobile communication BS used in an indoor environment such as homes, offices, etc. The femto BS has a similar concept with a pico-cell. Yet, the femto BS has a concept of having a more advanced function than the pico-cell. The femto BS is connected to an Internet protocol (IP) network widely used in homes or offices, and provides a mobile communication service by accessing to a core network of a mobile communication system. That is, the femto BS is connected to the core network of the mobile communication system through a digital subscriber line (DSL). A user of the mobile communication system may receive a service via a conventional macro BS in an outdoor environment, and may receive a service via the femto BS in an indoor environment. The femto BS improves indoor coverage of the mobile communication system by correcting a problem in which the conventional macro BS provides a deteriorating service inside a building. Since the femto BS can provide a service only to a specific designated user, a voice service and a data service can be provided with high quality. Further, the femto BS can provide a new service not provided by the macro BS. With the wide use of the femto BS, fixed-mobile convergence (FMC) can gain momentum, and industry-based costs can be reduced.

The service of the femto BS is affected by a poor line condition of an IP network, software rebooting, etc. For example, the femto BS may be temporarily powered off or may be disconnected from the core network of the mobile communication system. If the service of the femto BS is interrupted in an unexpected situation, a communication service provided to a user equipment may significantly deteriorate.

Accordingly, there is a need for a method capable of maintaining reliability of a communication service for a user equipment even if a service of a femto BS is recovered from a temporary interruption.

DISCLOSURE OF INVENTION

Technical Problem

The present invention provides a method and apparatus of performing service interruption and recovery of a femto base station while maintaining reliability of a communication service.

Solution to Problem

According to an aspect of the present invention, a method of operating a femto base station in a wireless communication system is provided. The method include transmitting a first announcement message indicating service interruption by using a paging message or broadcast message transmitted with a specific cycle, and transmitting a second announcement message indicating service recovery, wherein the second announcement message is transmitted to a user equipment or a macro base station having a wider cell area than the femto base station.

The first announcement message may comprise radio resource assignment for transmission of information regarding the service interruption.

The method may further include transmitting paging information which is modified by using a radio resource indicated by the first announcement message.

The method may further include transmitting paging information of the macro base station by using a radio resource indicated by the first announcement message.

A paging message may be transmitted from the macro base station to the user equipment after the first announcement message is transmitted until the second announcement message is transmitted.

The method may further include transmitting a service interruption period to a paging controller for managing the paging message.

The method may further include transmitting downlink traffic buffered in the paging controller to the user equipment during the service interruption period.

The first announcement message may include a dedicated ranging code for an access to the macro base station.

The first announcement message may include a service interruption reason.

In another aspect, a femto base station in a wireless communication system is configured to transmit a first announcement message indicating service interruption by using a paging message or broadcast message transmitted with a specific cycle, and transmit a second announcement message indicating service recovery, wherein the second announcement message is transmitted to a user equipment or a macro base station having a wider cell area than the femto base station.

Advantageous Effects of Invention

Reliability of a communication service can be maintained for a user equipment even if a service of a femto base station is temporarily interrupted.

BRIEF DESCRIPTION OF DRAWINGS

FIG. 1 shows a wireless communication system.

FIG. 2 shows an example of a frame structure.

FIG. 3 shows a method of operating a femto base station (BS) in a scheduled out of service (OoS) according to an embodiment of the present invention.

FIG. 4 shows a method of operating a femto BS in a scheduled OoS according to another embodiment of the present invention.

FIG. 5 shows a method of operating a femto BS in a scheduled OoS according to another embodiment of the present invention.

FIG. 6 shows a method of operating a femto BS in an unscheduled OoS according to an embodiment of the present invention.

FIG. 7 shows a method of operating a femto BS in an unscheduled OoS according to another embodiment of the present invention.

MODE FOR THE INVENTION

FIG. 1 shows a wireless communication system. The wireless communication system can be widely deployed to provide a variety of communication services, such as voices, packet data, etc.

Referring to FIG. 1, the wireless communication system includes at least one user equipment (UE) and a base station (BS). The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a node-B, a base transceiver system (BTS), an access point, etc.

There may be one or more cells within the coverage of the BS.

The BS may be classified into a femto BS 20 and a macro BS 60 according to cell coverage or deployment. A cell of the femto BS 20 is smaller than a cell of the macro BS 60. The cell of the femto BS 20 may fully or partially overlap with the cell of the macro BS 60. As such, a structure in which small-range cells are deployed in an overlapping manner within a wide-range cell is referred to as a hierarchy cell structure.

The femto BS 20 may also be referred to as other terminologies, such as a femto-cell, a home node-B, a closed subscribed group (CSG), etc. To distinguish from the femto-cell, the macro BS 60 may also be referred to as a macro-cell.

The femto BS 20 is connected to a femto gateway 30 through an Iuh interface. The Iuh interface represents an interface between the femto BS 20 and the femto gateway 30 through the IP network. The femto gateway 30 is an entity for managing at least one femto BS 20. The femto gateway 30 may perform registration, authentication, and security processes of the femto BS 20 so that the femto BS 20 can access to a core network 90 of the wireless communication system. The macro BS 60 is connected to a radio network control (RNC) 70 through an Iub interface. The RNC 70 is an entity for managing at least one macro BS 60, and connects the macro BS 60 to the core network 90. The macro BS 60 is connected to the core network 90 through a dedicated line, whereas the femto BS 20 is connected to the core network 90 through the IP network.

A UE accessing to the femto BS 20 is referred to as a femto UE 10. A UE accessing to the macro BS 60 is referred to as a macro UE 50. When the femto UE 10 is handed over to the macro BS, the femto UE 10 may become the macro UE 50. When the macro UE 50 is handed over to the femto BS, the macro UE 50 may become the femto UE 10.

A downlink (DL) represents a communication link from the BS to the UE, and an uplink (UL) represents a communication link from the UE to the BS. In the DL, a transmitter may be a part of the BS, and a receiver may be a part of the UE. In the UL, the transmitter may be a part of the UE 10 and the receiver may be a part of the BS.

There is no restriction on multiple access schemes used in the wireless communication system. Various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

FIG. 2 shows an example of a frame structure. This structure may be a frame structure of at least one of a macro-cell and a femto-cell in a hierarchy cell structure.

Referring to FIG. 2, a superframe includes a superframe header and four radio frames F0, F1, F2, and F3. Although it is shown that each superframe has a size of 20 milliseconds (ms) and each frame has a size of 5 ms, the present invention is not limited thereto. The superframe header may be located at a front-most position of the superframe. A common control channel is assigned to the superframe header. The common control channel is used to transmit information regarding frames constituting the superframe or control information (e.g., system information) that can be commonly utilized by all UEs within a cell. A synchronization channel for transmitting a synchronization signal may be deployed either inside or adjacent to the superframe header. The synchronization signal may represent cell information such as a cell identifier (ID).

One frame includes 8 subframes SF0, SF1, SF2, SF3, SF4, SF5, SF6, and SF7. Each subframe can be used for UL or DL transmission. Each subframe may consist of 6 or 7 OFDM symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission can be simultaneously performed while occupying different frequency bands.

A subframe includes at least one frequency partition. The frequency partition consists of at least one physical resource unit (PRU). The frequency partition may include a localized PRU and/or a distributed PRU. The frequency partition may be used for other purposes such as fractional frequency reuse (FFR) or multicast or broadcast service (MBS).

The PRU is defined as a basic physical unit for assigning resources including a plurality of consecutive OFDM symbols and a plurality of consecutive subcarriers. The number of OFDM symbols included in the PRU may be equal to the number of OFDM symbols included in one subframe. For example, when one subframe consists of six OFDM symbols, the PRU may be defined with 18 subcarriers and six OFDM symbols. A logical resource unit (LRU) is a basic logical unit for distributed resource assignment and localized resource assignment. The LRU is defined with a plurality of OFDM symbols and a plurality of subcarriers, and includes pilots used in the PRU. Therefore, one LRU includes a specific number of subcarriers, where the specific number depends on the number of assigned pilots.

A logical distributed resource unit (DRU) may be used to obtain a frequency diversity gain. The DRU includes a distributed subcarrier group in one frequency partition. The DRU has the same size as the PRU. One subcarrier is a basic unit for constituting the DRU.

A logical contiguous resource unit (CRU) may be used to obtain a frequency selective scheduling gain. The CRU includes a localized subcarrier group. The CRU has the same size as the PRU.

Now, a method of performing service interruption and recovery of a femto BS while maintaining reliability of a communication service will be described. A state where a service of the femto BS is interrupted is hereinafter referred to as an out of service (OoS). The OoS of the femto BS can be classified into a scheduled OoS and an unscheduled OoS. For example, when rebooting is necessary due to software download/install or the like, the femto BS may operate by scheduling its OoS. The scheduled OoS may be performed when a UE receiving a service from the femto BS operates in an idle mode or a sleep mode. The unscheduled OoS may occur in a situation unexpected by the femto BS, such as in a case where the femto BS experiences power failure or a network is disconnected or the like.

<Scheduled Out of Service>

FIG. 3 shows a method of operating a femto BS in a scheduled out of service (OoS) according to an embodiment of the present invention.

Referring to FIG. 3, for the scheduled OoS, the femto BS transmits a OoS notification message to a paging controller (step S110). The paging controller manages a paging signal for call or data packet transmission for a UE. The OoS notification message may include a scheduled OoS duration, a femto BS ID (BSID), etc. By notifying the scheduled OoS duration to the paging controller, the paging controller can buffer DL traffic which arrives during the scheduled OoS duration.

For the scheduled OoS, the femto BS transmits a paging advertisement (PAG-ADV) message or a broadcast message to the UE (step S115). The PAG-ADV message or the broadcast message may include an OoS indication indicating that the femto BS performs the scheduled OoS, OoS information indicating resource information for transmitting detailed information on the scheduled OoS, etc. The OoS indication and the OoS information may be transmitted using the PAG-ADV message monitored by the UE in the idle mode so that the UE operating in the idle mode in the coverage of the femto BS can receive the OoS indication and the OoS information. Alternatively, the OoS indication and the OoS information may be transmitted using the broadcast message transmitted in a cycle monitored by the UE in the idle mode. Alternatively, the detailed information on the scheduled OoS may be included in the PAG-ADV message in transmission.

The femto BS transmits changed paging information to the UE (step S120). Transmission of the changed paging information may be indicated by the PAG-ADV message or the broadcast message. The changed paging information may include information (e.g., a paging cycle, a paging offset, a paging listening interval, an OoS reason, etc.) for transmitting the paging message by avoiding the scheduled OoS duration. The OoS reason may be transmitted using the PAG-ADV message or the broadcast message. The UE may receive a paging message transmitted at a later time according to the changed paging information.

The femto BS transmits the PAG-ADV message at the changed paging cycle and paging offset (step S130). An old paging offset may be included in the scheduled OoS duration, and the PAG-ADV message to be transmitted at the scheduled OoS duration is not transmitted. The UE does not monitor the paging message at an old paging cycle and paging offset.

When DL traffic is arrived to the UE during the scheduled OoS duration, the paging controller buffers the DL traffic (step S140). The paging controller transmits a paging announcement message to the femto BS when the scheduled OoS duration is over (step S145).

When transmitting a first PAG-ADV message after the scheduled OoS duration is over, the femto BS transmits the PAG-ADV message by including a DL traffic indication (step S150). The first PAG-ADV message is transmitted according to the changed paging cycle and paging offset. The DL traffic indication indicates that there is DL traffic to be transmitted to the UE.

The UE performs network re-entry to the femto BS to receive the DL traffic in the idle mode (step S160). After the UE is re-registered to the femto BS and thus is in an active mode, the DL traffic buffered by the paging controller is transmitted to the UE via the femto BS (step S170).

As such, when the femto BS performs the scheduled OoS, the paging message can be transmitted by avoiding the scheduled OoS duration in such a manner that the paging cycle, the paging offset, and the like are changed, and the scheduled OoS duration is notified to the paging controller. As a result, DL traffic can be transmitted to the UE with a minimum delay without any loss.

FIG. 4 shows a method of operating a femto BS in a scheduled OoS according to another embodiment of the present invention.

Referring to FIG. 4, for the scheduled OoS, the femto BS transmits a OoS notification message to a paging controller (S210). The OoS notification message may include a scheduled OoS duration, a femto BS ID (BSID), etc. By notifying the scheduled OoS duration to the paging controller, the paging controller may buffer DL traffic which arrives during the scheduled OoS duration, or may transmit the DL traffic to an overlay macro BS of which a cell area overlaps with that of the femto BS.

For the scheduled OoS, the femto BS transmits a PAG-ADV message or a broadcast message to a UE (step S215). The PAG-ADV message or the broadcast message may include an OoS indication indicating that the femto BS performs the scheduled OoS, OoS information indicating resource information for transmitting detailed information on the scheduled OoS, etc. The detailed information on the scheduled OoS may be included in the PAG-ADV message The femto BS transmits paging information of the overlay macro BS to the UE (step S220). Transmission of the paging information to the overlay macro BS may be indicated by the PAG-ADV message or the broadcast message. The paging information of the overlay macro BS may include a paging cycle, paging offset, paging listening interval of the overlay macro BS and an OoS reason of the femto BS. The OoS reason may be transmitted using the PAG-ADV message or the broadcast message. The UE may receive the paging message of the overlay macro BS during the scheduled OoS duration by using the paging information of the overlay macro BS. The UE does not monitor the paging message at the paging cycle and paging offset of the femto BS during the scheduled OoS duration.

When DL traffic is arrived to the UE during the scheduled OoS duration, the DL traffic may be arrived to the paging controller (step S230). The paging controller may buffer the UE's DL traffic arrived during the scheduled OoS duration or may transmit the DL traffic to the UE via the overlay macro BS. In a case where the paging controller buffers the DL traffic, as described with reference to FIG. 3, the buffered DL traffic may be transmitted after the scheduled OoS duration of the femto BS is over.

The paging controller transmits the paging notification message to the overlay macro BS to transmit the UE's DL traffic arrived during the scheduled OoS duration to the UE via the overlay macro BS (step S235). The overlay macro BS transmits the PAG-ADV message to the UE upon receiving the paging notification message (step S240). A DL traffic indication may be included in the PAG-ADV message of the overlay macro BS. The UE may receive the DL traffic from the overlay macro BS during the scheduled OoS duration of the femto BS.

When the femto BS is recovered from the scheduled OoS, the femto BS may transmit a recovery indication, i.e., a 'recovery from OoS notification' message, to the UE (step S250). The UE stores previously obtained paging information of the femto BS (e.g., the paging cycle, the paging offset, the paging listening interval, etc.) during the scheduled OoS duration instead of releasing the paging information. Upon receiving the recovery indication, the UE may receive the paging message of the femto BS by using the stored paging information of the femto BS.

After the scheduled OoS duration is over, the UE's DL traffic may be arrived to the paging controller (step S260). The paging controller transmits the paging notification message to the femto BS in response to the DL traffic arrived after the scheduled OoS duration is over (step S265). Upon receiving the paging notification message, the femto BS transmits a PAG-ADV message including a DL traffic indication to the UE (step S270). The UE may receive the DL traffic in an idle mode by performing network re-entry to the femto BS.

Since the paging message or the DL traffic can be transmitted from the macro BS during the scheduled OoS duration when the femto BS performs the scheduled OoS, the paging message or the DL traffic can be persistently transmitted to the UE.

FIG. 5 shows a method of operating a femto BS in a scheduled OoS according to another embodiment of the present invention.

Referring to FIG. 5, OoS notification message transmission (step S310), PAG-ADV or broadcast message transmission (step S315), and overlay macro BS's paging information transmission (step S320) are performed in the same manner as described with reference to FIG. 4. During the scheduled OoS duration, UE's DL traffic arrival (step S330), paging notification message transmission (step S335), and overlay macro BS's PAG-ADV message transmission (step S340) may be performed in the same manner as described with reference to FIG. 4.

When the femto BS is recovered from the scheduled OoS, the femto BS transmits a recovery message to a macro BS (step S350). Upon receiving the recovery message from the femto BS, the macro BS transmits a recovery indication of the femto BS, i.e., a 'recovery from OoS notification' message, to the UE (step S355). The UE stores previously obtained paging information of the femto BS (e.g., the paging cycle, the paging offset, the paging listening interval, etc.) during the scheduled OoS duration instead of releasing the paging information. Upon receiving the recovery indication, the UE may receive the paging message of the femto BS by using the stored paging information of the femto BS.

After the scheduled OoS duration is over, the UE's DL traffic may be arrived to the paging controller (step S360). The paging controller transmits the paging notification message to the femto BS in response to the DL traffic arrived after the scheduled OoS duration is over (step S365). Upon receiving the paging notification message, the femto BS transmits a PAG-ADV message including a DL traffic indication to the UE (step S370). The UE may receive the DL traffic in an idle mode by performing network re-entry to the femto BS.

<Unscheduled Out of Service>

FIG. 6 shows a method of operating a femto BS in an unscheduled OoS according to an embodiment of the present invention.

Referring to FIG. 6, the femto BS operates in case of an unexpected power failure. The femto BS may experience power failure in a situation unexpected by the femto BS. To cope with such a situation, the femto BS may have backup power. The femto BS performs the unscheduled OoS when the backup power reaches a threshold after switching to the backup power. The femto BS may store UE context in advance, or may store the UE context when the backup power reaches the threshold. The UE context includes a UE ID, a femto BS ID, a overlay macro BS ID, a current paging cycle, a current paging offset, a current paging listening interval, a dedicated ranging code for a UE, etc.

When the backup power reaches the threshold, the femto BS transmits an OoS notification message including the UE context to a macro BS (step S410). The femto BS may transmit the OoS notification message to a paging controller. Alternatively, the macro BS may transmit the OoS notification message including the UE context to the paging controller (step S415). The paging controller may store the UE context, and then may use the UE context in a process of transmitting a paging message to the UE.

The macro BS provides the dedicated ranging code to the macro BS, wherein the dedicated ranging code is used when the UE accesses to the macro BS from the femto BS in the unscheduled OoS (step S420). The dedicated ranging code may be either a ranging code used for an access to the femto BS or a ranging code randomly selected by the macro BS.

The femto BS transmits a PAG-ADV message to the UE to instruct the UE to access to the macro BS (step S425). The PAG-ADV message may include information such as a macro BS ID, a dedicated ranging code provided by the macro BS, a OoS reason, etc.

The UE transmits the dedicated ranging code to the macro BS (step S430). Since the dedicated ranging code is a ranging code assigned by the macro BS, the macro BS can know that the dedicated ranging code of the UE is correct. The macro BS may process the dedicated ranging code of the UE by using non-contention-based ranging. The macro BS transmits a ranging response (RNG-RSP) message to the UE in response to the dedicated ranging code (step S435). The RNG-RSP message includes uplink radio resource assignment information to allow the UE to be able to transmit a ranging request (RNG-REQ) message.

The UE transmits the RNG-REQ message by using the assigned uplink radio resource (step S440). The RNG-REQ message may indicate a ranging and location update request based on the OoS of the femto BS. The macro BS transmits an RNG-RSP message including paging information of the macro BS (e.g., a paging cycle, a paging offset, a paging listening interval, etc.) in response to the RNG-REQ message (step S445).

The UE may receive a PAG-ADV message from the macro BS by using the paging information of the macro BS (step S450). Since the paging controller knows that the femto BS operates in the unscheduled OoS, the paging controller may transmit DL traffic to the UE via the macro BS upon generation of DL traffic for the UE.

The femto BS transmits a recovery notification message to the macro BS when power is recovered (step S460). The femto BS may transmit the recovery notification message to the paging controller. Alternatively, the macro BS may transmit the recovery notification message to the paging controller (step S465).

The macro BS transmits a PAG-ADV message to the UE to instruct the UE to recover the femto BS from the unscheduled OoS and to perform handover (HO) to the femto BS (step S470). By using the PAG-ADV message, the UE can know that the femto BS is recovered from the unscheduled OoS.

The UE transmits the ranging code to the femto BS by using the stored paging information of the femto BS (e.g., the paging cycle, the paging offset, the paging listening interval, etc.) (step S480). Since the UE performs handover from the macro BS to the femto BS, any ranging code can be selected for use from ranging codes for handover. The femto BS transmits an RNG-RSP message including uplink radio resource assignment information in response to the ranging code of the UE (step S485).

The UE transmits the RNG-REQ message by using the assigned uplink radio resource (step S490). The RNG-REQ message may indicate a ranging and location update request based on the OoS of the femto BS. In response to the RNG-REQ message, the femto BS transmits an RNG-RSP message indicating that a location update process is performed according to a location update request of the UE (step S495). The RNG-RSP message may include the paging information of the femto BS (e.g., the paging cycle, the paging offset, the paging listening interval, etc.). The femto BS recovered from the unscheduled OoS may use paging with a new cycle, and information thereof may be included in the RNG-RSP message.

The UE may receive the PAG-ADV message from the femto BS by using the paging information of the femto BS (e.g., the paging cycle, the paging offset, the paging listening interval, etc.) (step S500).

When the femto BS performs the unscheduled OoS, reliability of a communication service can be maintained since the service can be persistently provided to the UE via the macro BS.

FIG. 7 shows a method of operating a femto BS in an unscheduled OoS according to another embodiment of the present invention.

Referring to FIG. 7, the femto BS operates in case of unexpected backhaul failure. The backhaul of the femto BS uses an IP network. The femto BS may experience backhaul failure in a situation unexpected by the femto BS. When the femto BS experiences the backhaul failure, the femto BS may not be able to communicate with a macro BS and a paging controller. Since the backhaul of the macro BS uses a dedicated network, communication between the macro BS and the paging controller is not disabled in an unexpected manner.

When the femto BS experiences the backhaul failure, the femto BS transmits a PAG-ADV message including backhaul down notification to a UE (step S510). The PAG-ADV message is a message for instructing the UE to perform ranging to an overlay macro BS.

The UE transmits a femto BS ID in a backhaul down state and an RNG-REQ message for indicating ranging based on backhaul down notification to the macro BS (step S520). The RNG-REQ message may include a location update request. The macro BS transmits an RNG-RSP message in response to the RNG-REQ message (step S525). The RNG-RSP message may include paging information of the macro BS (e.g., a paging cycle, a paging offset, a paging listening interval, a paging group ID, a paging controller ID, etc.). In this case, the paging group ID may indicate only a region of the overlay macro BS of which a cell area overlaps with a cell area of the femto BS to which the UE can access. That is, the paging controller may transmit a paging notification message only to the overlay macro BS of the UE.

The UE may receive a PAG-ADV message from the macro BS by using the paging information of the macro BS (step S530).

When the backhaul of the femto BS is recovered, the femto BS transmits an OoS notification message indicating 'backhaul on' to the macro BS (step S540). The femto BS may transmit the OoS notification message to the paging controller. Alternatively, the macro BS may transmit the OoS notification message of the femto BS to the paging controller (step S545).

The macro BS transmits a PAG-ADV message to the UE to instruct the UE to recover the femto BS from an unscheduled OoS and to perform ranging to the femto BS (step S550). By using the PAG-ADV message, the UE can know that the femto BS is recovered from the unscheduled OoS.

The UE transmits the ranging code to the femto BS by using the stored paging information of the femto BS (e.g., the paging cycle, the paging offset, the paging listening interval, etc.) (step S560). Since the UE performs handover from the macro BS to the femto BS, any ranging code can be selected for use from ranging codes for handover. The femto BS transmits an RNG-RSP message including uplink radio resource assignment information in response to the ranging code of the UE (step S565).

The UE transmits the RNG-REQ message by using the assigned uplink radio resource (step S570). The RNG-REQ message may indicate a ranging and location update request based on the OoS of the femto BS. In response to the RNG-REQ message, the femto BS transmits an RNG-RSP message indicating that a location update process is performed according to a location update request of the UE (step S575). The RNG-RSP message may include the paging information of the femto BS (e.g., the paging cycle, the paging offset, the paging listening interval, etc.). The femto BS recovered from the unscheduled OoS may use paging with a new cycle, and information thereof may be included in the RNG-RSP message.

The UE may receive the PAG-ADV message from the femto BS by using the paging information of the femto BS (e.g., the paging cycle, the paging offset, the paging listening interval, etc.) (step S580).

Although it is assumed in the above description that a UE located in a cell area of a femto BS is in an idle mode, a mode of the UE is not limited to a specific mode. Thus, a method of operating the femto BS in a scheduled OoS or an unscheduled OoS of the present invention can also apply to a case where the mode of the UE is an active mode or a sleep mode.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of operating a femto base station in a wireless communication system, the method comprising:
   transmitting a service interruption period to a paging controller;
   transmitting a first announcement message indicating service interruption, the first announcement message including a paging or broadcast message transmitted with a specific cycle;
   transmitting downlink traffic that is buffered in the paging controller to the user equipment during the service interruption period;
   transmitting changed paging information indicated by the paging message or the broadcast message; and
   transmitting a second announcement message indicating service recovery, the second announcement message transmitted to a user equipment or macro base station having a wider cell area than the femto base station.

2. The method of claim 1, wherein the first announcement message comprises radio resource assignment for transmission of information regarding the service interruption.

3. The method of claim 2, wherein the changed paging information is transmitted by using a radio resource assigned by the radio resource assignment.

4. The method of claim 1, wherein the changed paging information is paging information of the macro base station.

5. The method of claim 1, wherein paging messages are transmitted from the macro base station to the user equipment after the first announcement message is transmitted and until the second announcement message is transmitted.

6. The method of claim 1, wherein the first announcement message comprises a dedicated ranging code for access to the macro base station.

7. The method of claim 1, wherein the first announcement message comprises a service interruption reason.

8. A femto base station in a wireless communication system, wherein the femto base station is configured to:
   transmit a service interruption period to a paging controller;
   transmit a first announcement message indicating service interruption, the first announcement message including a paging or broadcast message transmitted with a specific cycle;
   transmit downlink traffic buffered in the paging controller to the user equipment during the service interruption period; and
   transmit changed paging information indicated by the paging message or the broadcast message; and
   transmit a second announcement message indicating service recovery, the second announcement message transmitted to a user equipment or macro base station having a wider cell area than the femto base station.

9. The femto base station of claim 8, wherein the first announcement message comprises radio resource assignment for transmission of information regarding the service interruption.

10. The femto base station of claim 9, wherein the changed paging information is transmitted by using a radio resource assigned by the radio resource assignment.

11. The femto base station of claim 9, wherein the changed paging information is paging information of the macro base station.

12. The femto base station of claim 8, wherein paging messages are transmitted from the macro base station to the user equipment after the first announcement message is transmitted and until the second announcement message is transmitted.

* * * * *